(12) United States Patent
Kim

(10) Patent No.: US 6,281,944 B1
(45) Date of Patent: Aug. 28, 2001

(54) APPARATUS AND METHOD FOR CORRECTING NON-LINEAR CHARACTERISTICS IN DISPLAY DEVICE

(75) Inventor: Han Jin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/132,531

(22) Filed: Aug. 11, 1998

(30) Foreign Application Priority Data

Aug. 25, 1997 (KR) ............................................. P97-40486

(51) Int. Cl.[7] ................................................... H04N 5/202
(52) U.S. Cl. ............................................. 348/674; 348/572
(58) Field of Search ..................................... 348/674, 675, 348/254, 572; H04N 5/202, 9/69

(56) References Cited

U.S. PATENT DOCUMENTS 6,034,660 * 3/2000 Millward .............................. 348/674

* cited by examiner

*Primary Examiner*—Sherrie Hsia
(74) *Attorney, Agent, or Firm*—Fleshner & Kim, LLP

(57) ABSTRACT

An apparatus for correcting a non-linear characteristic in a display device to keep the number of displayable colors as it is and to unify a picture quality for each product. In the apparatus, a bias voltage to be applied to a digital to analog converter converting a digital image signal into an analog image signal is changed in accordance with a logical value of the digital image signal. Accordingly, the apparatus generates an analog image signal in which the non-linear characteristic in the display device is compensated.

10 Claims, 5 Drawing Sheets

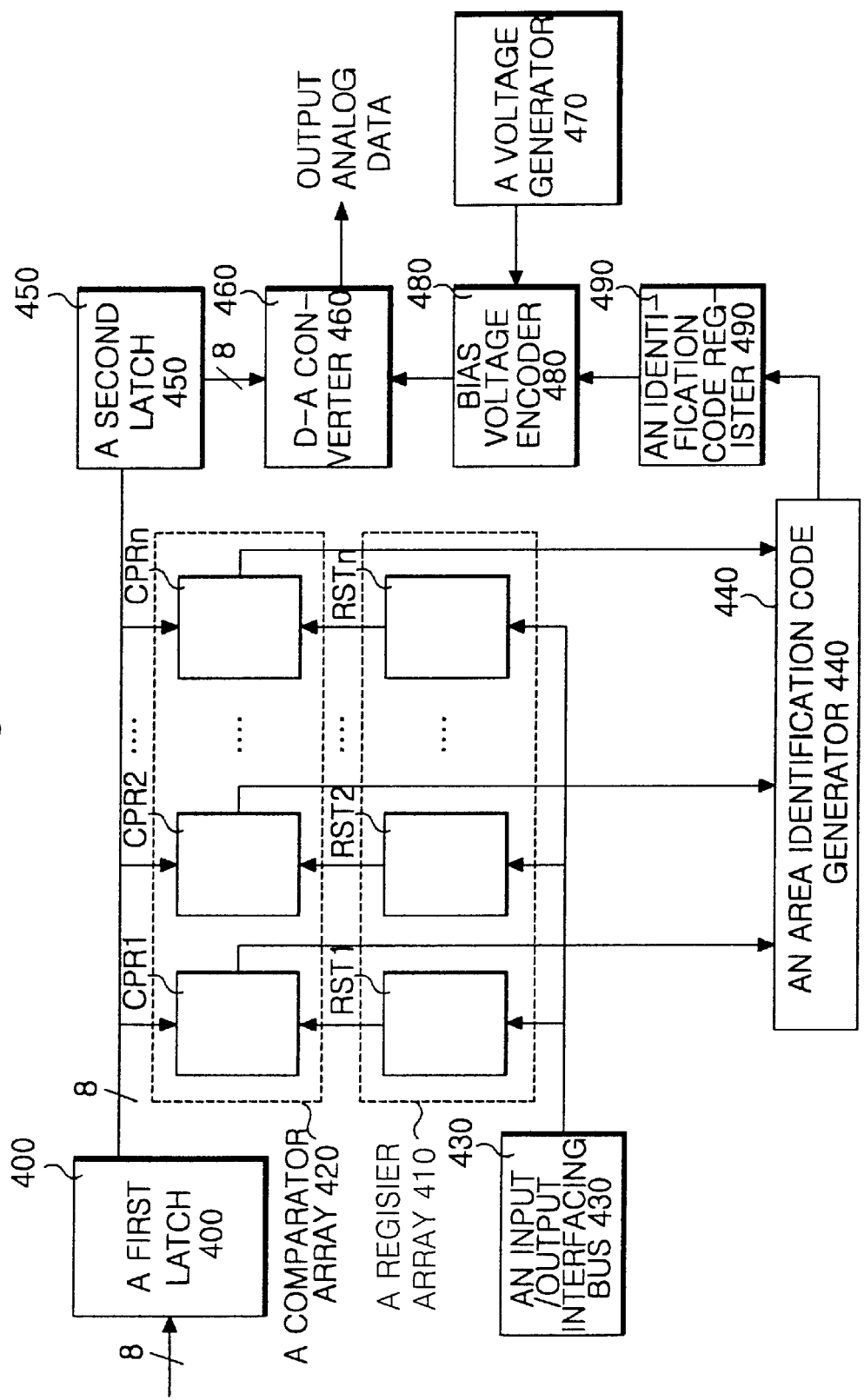

APPARATUS AND METHOD FOR CORRECTING NON-LINEAR CHARACTERISTICS IN DISPLAY DEVICE

BACKGROUND OF THE INVENTION

1. Field of the Invention

This invention relates to a technique of correcting for a non-linear characteristic in a display device, and more particularly to an apparatus and method that is adapted to compensate for a non-linear characteristic in a flat display device, such as a liquid crystal panel, in which an image signal is processed in a digital system and driven with an analog signal.

2. Description of the Prior Art

Recently, a flat panel display device has been developed and spread as a picture display device. Such a flat display device requires that, although picture elements(or pixels) are driven with an analog signal like a liquid crystal panel or a plasma display panel, an image signal to be applied to each pixel should be processed in a digital system. Also, the plat display device is unable to perform an electro-light conversion in the same shape as an electrical signal like the existing cathode ray tube. In other words, the flat display device generates a light signal changing non-linearly with respect to an image signal changing linearly. For example, in the case of a liquid crystal panel, a light quantity transmitting the liquid crystal panel responds non-linearly to an image signal changing linearly. The flat display device having such a non-linear characteristic referred to as a gamma error has a disadvantage in that it has a low picture quality. In order to overcome this disadvantage, a display apparatus employing the flat display device includes circuits for compensating for a non-linear characteristic in the flat display device.

FIG. 1 shows a conventional liquid crystal display apparatus having a gamma correction function. As shown in FIG. 1, the liquid crystal display apparatus includes an analog to digital converter 110, hereinafter referred to as "A-D converter", receiving an analog image signal, and a first memory 120, a digital signal processor(DSP) 130, a second memory 140, a digital to analog converter 150, hereinafter referred to as "D-A converter", and a liquid crystal panel driver 160 that are connected, in series, to the A-D converter 110. The A-D converter 110 converts an analog image signal into an 8 bit digital image signal. The digital image signal generated from the A-D converter 110 are temporarily stored in the first memory 120. The DSP 130 converts the digital image signal stored in the first memory 120 into an image signal having such a shape that is required by a flat display device, i.e., a liquid crystal panel. In other words, a shape of the digital image signal stored in the first memory 120 is converted to meet a driving condition of the liquid crystal panel by means of the DSP 130. The second memory 140 compensates for a gamma error of the digital image signal shape-converted by means of the DSP 130, that is, a non-linear characteristic of the liquid crystal panel. More specifically, the second memory 140 generates a compensating image signal having a gray scale different from the digital image signal from the DSP 130. In order to perform such a gamma compensation of the digital image signal, a look-up table, in which compensating logical values correspond to each of logical values(i.e., 256 logical values) in a digital image signal, is stored in the second memory 140. Accordingly, the digital image signal acts as an address signal of the second memory 140. Also, a part of the logical values of the compensating image signal output from the second memory 140 corresponds commonly to at least two logical values in the logical values of the digital image signal. The compensating image signal output from the second memory 140 is converted into a shape of analog signal by means of the A-D converter 150. Then, the liquid crystal driver 160 drives a liquid crystal panel(not shown) with an output signal of the D-A converter 150.

The liquid crystal display apparatus in FIG. 1 further includes a timing controller 170 and a data controller 180 that are controlled by a system controller 190. The timing controller 170 divides operation timing of the A-D converter 110, the first memory 120, the DSP 130, the second memory 140, the D-A converter 150 and the liquid crystal panel driver 160. The data controller 180 controls a timing of a signal applied from the liquid crystal panel driver 160 to the liquid crystal panel.

In the liquid crystal display apparatus using such a look-up table, a gray scale of the compensating image signal becomes smaller than that of the digital image signal. In other words, when the digital image signal has a 8 bit, the gray scale of the compensating image signal becomes smaller than 256 steps which are a gray scale of the digital image signal having 256 steps. Due to this, a gamma compensating apparatus using the look-up table lowers a gray scale of the image signal applied to the liquid crystal panel driver 160. As a result, the number of colors that can be displayed on the flat display device is reduced.

FIG. 2 shows a liquid crystal display apparatus having a gamma correction function of analog system. As shown in FIG. 2, the liquid crystal display apparatus includes a AD converter 210 for converting an analog image signal into a digital image signal, and a memory 220, a DSP 230, a D-A converter 240, a gamma corrector 250 and a flat panel driver 260 that are connected, in series, to the A-D converter 210. The memory 220 temporarily stores the digital image signal applied from the A-D converter 210. The DSP 230 converts the digital image signal stored in the memory 220 into an image signal having such a shape that is required by a flat display device(not shown), i.e., a liquid crystal panel. In other words, a shape of the digital image signal stored in the first memory 220 is converted to meet a driving condition of the flat display device by means of the DSP 230. The shape-converted digital image signal is applied to the gamma corrector 250 after the compensating image signal was converted into a shape of analog signal by means of the D-A converter 240. The gamma corrector 250 amplifies the analog image signal by a different gain in accordance with a level of the analog image signal from the D-A converter 240, thereby compensating a non-linear characteristic of the liquid crystal panel, that is, a gamma error. Then, the flat panel driver 260 drives the flat display device with the compensated analog image signal.

The flat display apparatus in FIG. 2 further includes a timing controller 270 and a gain controller 280 that are controlled by means of a system controller 290. The timing controller 270 divides an operation timing of each of the A-D converter 210, the memory 220, the DSP 230 and the gamma corrector 250. The gain controller 280 controls an amplification factor of the gamma corrector under the system controller 290. To this end, the gain controller 290 divides voltage levels of an analog image signal into a number of level areas and has gain values given to each level area. The gamma corrector 250, in which an amplification factor is controlled by means of the gain controller 280, includes a plurality of amplifiers having a different amplification factor in response to each level area of the analog image signal or a non-linear amplifier having a variable amplification factor.

In the flat display apparatus having a gamma correction function of analog system as described above, since an analog image signal is compensated by means of the plurality of amplifiers having a different amplification factor or the non-linear amplifier, a non-linear characteristic, that is, a gamma error of the flat display device can not be compensated accurately. Also, in the flat display apparatus having a gamma correction function of analog system, it is difficult to control a gain of an amplifier, so that it causes the reduced productivity as well as a different picture quality for each product.

In view of this, there is required an apparatus and method that is suitable for correcting a non-linear characteristic of a display device in such a manner to keep the number of displayable colors as it is and to unify a picture quality for each product.

SUMMARY OF THE INVENTION

Accordingly, it is an object of the present invention to provide an apparatus and method for correcting a nonlinear characteristic in a display device wherein the number of displayable colors can be kept as it is and a picture for each product can be unified.

In order to achieve this and other objects of the invention, a non-linear characteristic correcting apparatus in a display device according to one aspect of the present invention includes signal input means for receiving a digital image signal; a digital to analog converter for converting the digital image signal from the signal input means into an analog image signal required by the display device; and gamma correcting means for controlling a bias voltage applied to the digital to analog converter in accordance with a logical value of the digital image signal to compensate for a non-linear characteristic in the display device.

A non-linear characteristic correcting apparatus in a display device according to another aspect of the present invention includes signal input means for receiving a digital image signal; a digital to analog converter for converting the digital image signal from the signal input means into an analog image signal required by the display device; area dividing means for dividing logical values available to the digital image signal into a plurality of areas; and gamma correcting means for controlling a bias voltage applied to the digital to analog converter in accordance with whether the digital image signal from the signal input means belongs to any one of the plurality of areas to compensate for a non-linear characteristic in the display device.

A non-linear characteristic correcting method in a display device according to still another aspect of the present invention includes receiving a digital image signal; selecting any one of a plurality of bias voltages in response to a logical value of the digital image signal; and converting the digital image signal into an analog image signal using the selected bias voltage to compensate for a non-linear characteristic in the display device required by the display apparatus.

BRIEF DESCRIPTION OF THE DRAWINGS

These and other objects of the invention will be apparent from the following detailed description of the embodiments of the present invention with reference to the accompanying drawings, in which:

FIG. 4 is a detailed block diagram of the digital to analog converter having a gamma correction function shown in FIG. 3.

DETAILED DESCRIPTION OF THE PREFERRED EMBODIMENT

Figure 1:
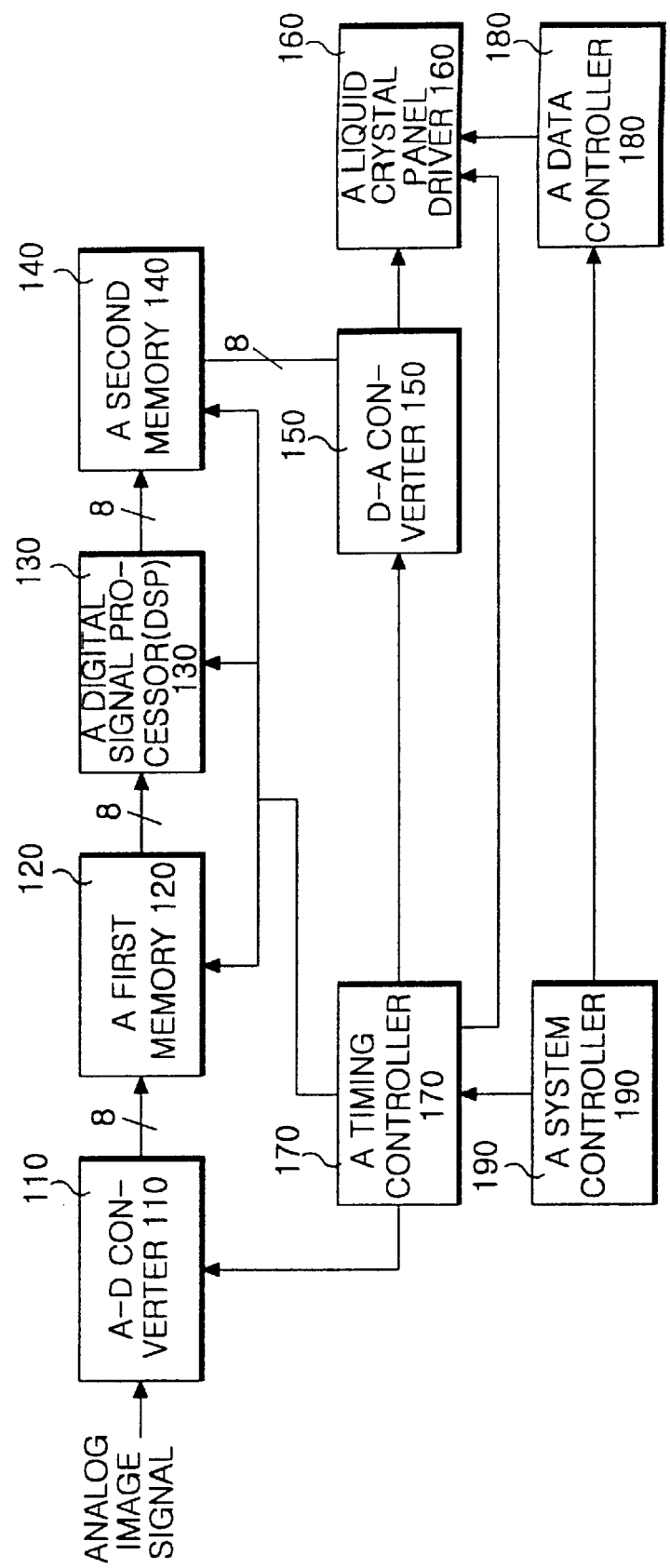
FIG. 1 is a schematic block diagram showing a display apparatus to which an example of the conventional nonlinear characteristic correcting apparatus in a display device is applied.
Figure 2:
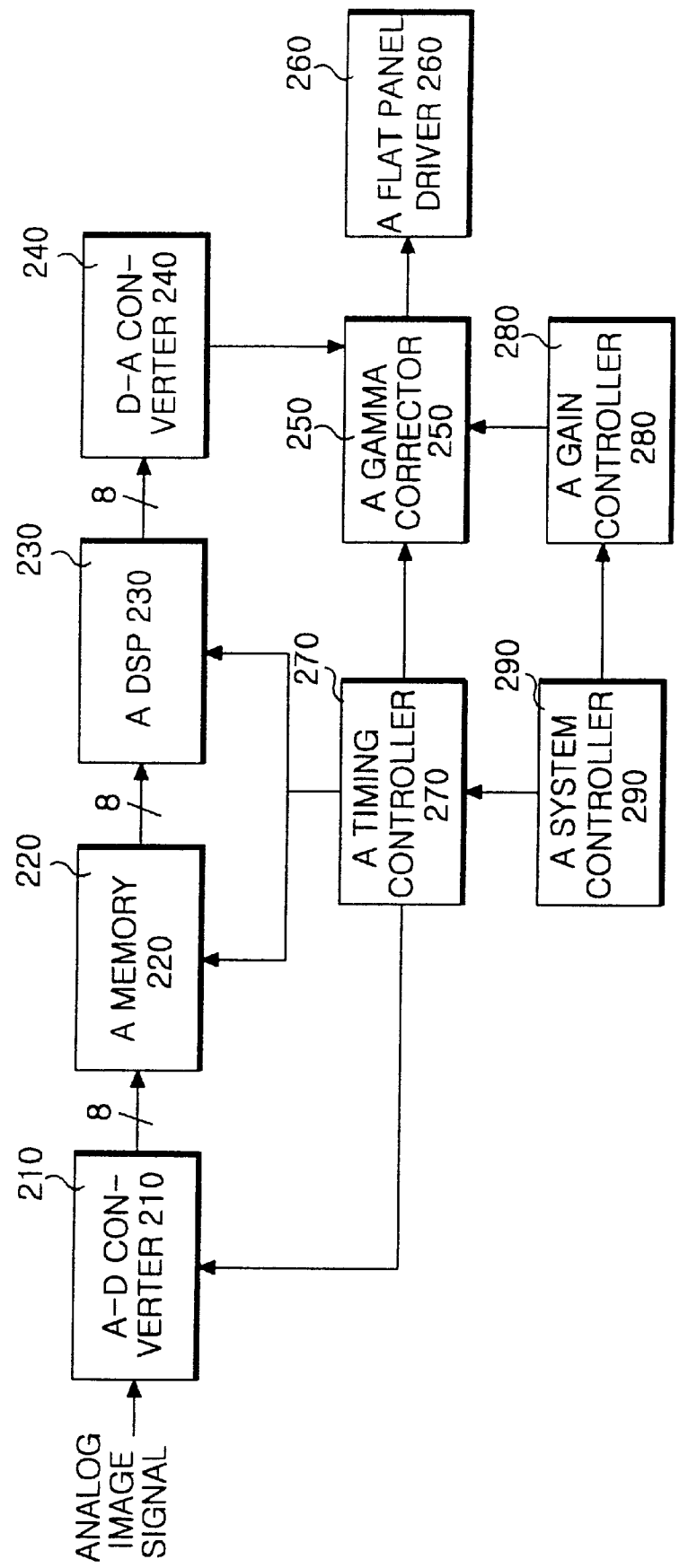
FIG. 2 is a schematic block diagram showing a display apparatus to which another example of the conventional non-linear characteristic correcting apparatus in a display device is applied.
Figure 3:
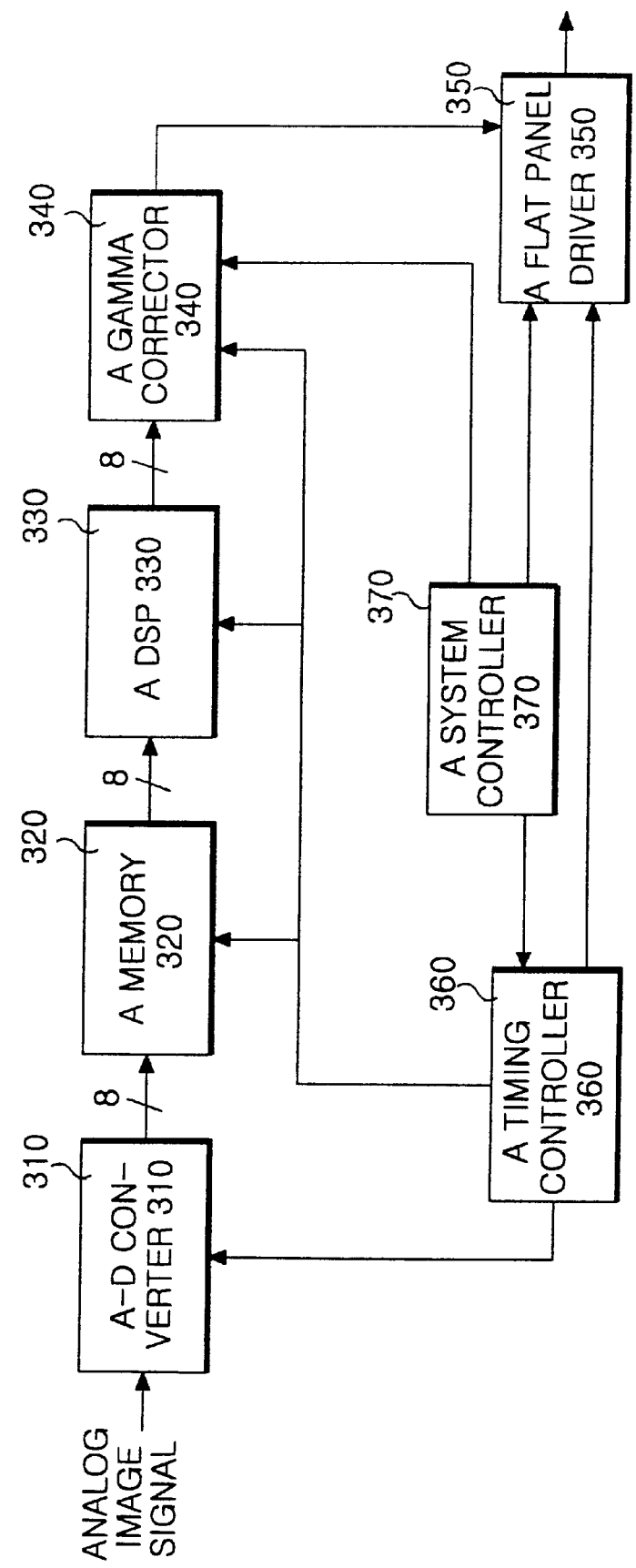
FIG. 3 is a schematic block diagram showing a display apparatus to which a non-linear characteristic correcting apparatus in a display device according to an embodiment of the present invention is applied.

Referring to FIG. 3, there is shown a display system to which a non-linear characteristic correcting apparatus in a display device according to a preferred embodiment of the present invention is applied. In FIG. 3, the display system includes an A-D converter 310 for converting an analog image signal into a 8 bit digital image signal, and a memory 320 and a DSP 330 that are connected, in series, to the A-D converter 310. The memory 320 temporally stores the digital image signal from the A-D converter 310. The DSP 330 converts the digital image signal stored in the memory 320 into an image signal having such a shape that is required by a flat display device(not shown) such as a flat panel. In other words, a shape of the digital image signal stored in the memory 320 is converted to meet a driving condition of the flat display device by means of the DSP 330.

The display system further includes a gamma corrector 340 having a digital to analog conversion function and a flat panel driver 350 that are connected to the DSP 330, and a timing controller 360 controlled by means of a system controller 370. The gamma corrector 340 converts a digital image signal into an analog image signal using a bias voltage set different in voltage level system in response to a logical value of the digital image signal from the DSP 330, thereby correcting a non-linear characteristic(i.e., a gamma error) in the flat display device. The flat panel driver 350 drives a flat panel, such as liquid crystal panel, with the gamma-corrected analog image signal from the gamma corrector 340. The timing controller 360 decides operation timing of the A-D converter 310, the memory 320, the DSP 330, the gamma corrector 340 and the flat panel driver 350 under control of the system controller 370. The system controller 370 controls a timing controlled state in the timing controller 360 and a driving condition of the plat panel driver 350. Also, the system controller 370 controls a compensation condition of non-linear characteristic in the flat display device performed at the gamma corrector 340. In other words, the system controller 370 changes the compensation condition of the gamma corrector 340 depending upon whether the plat display device is a liquid crystal panel, a plasma display panel or other display device.

FIG. 4 is a detailed block diagram of a preferred embodiment of the gamma corrector 340 shown in FIG. 3. As shown in FIG. 4, the gamma corrector 340 includes a first latch 400 for temporarily storing a digital image signal, a register array 410 for storing a plurality of area division values, and a comparator array 420 for receiving the plurality of area division values from the register array 410. The first latch 400 temporarily stores the digital image signal shape-converted from the DSP 330 shown in FIG. 3. The register array 410 consists of n registers RST1 to RSTn each storing one area boundary value. The n area boundary values to be stored to the n registers RST1 to RSTn are generated at the system controller 370 in FIG. 3 connected to an input/output (I/O) interfacing bus 430 and which become different in accordance with a type of flat display device. Further, the n area boundary values divides logical values available to a digital image signal into n+1 areas. In other words, the area boundary values determines a compensating condition of the gamma corrector 340. The comparator array 420 includes n comparators CPR1 to CPRn correspondingly connected to the n registers RST1 to RSTn to commonly receive the digital image signal from the first latch 400. Each comparator CPR1 to CPRn compares a logical value of the digital image signal from the first latch 400 with an area division value of the correspondingly connected register RST and generate the compared result at an area identification code generator 440. The area identification code generator 440 determines whether the currently received digital image signal belongs to any one of the n+1 areas on a basis of a logical state of an output signal of each comparator CPR1 to CPRn and generates an area identification code in accordance with the determined result.

The gamma corrector 340 further includes a second latch 450 and a D-A converter 460 that are connected, in series, to the first latch 400, a bias voltage encoder 480 for receiving a plurality of bias voltages from a voltage generator 470, and an identification code register 490 connected between the bias voltage encoder 480 and the area identification code generator 440. The second latch 450 allows the digital image signal from the first latch 400 to be applied to the D-A converter 460 at a time point when a bias voltage signal is applied from the bias voltage encoder 480 to the D-A converter 460. In other words, the second latch 450 serves to synchronize the bias voltage signal applied to the D-A converter 460 with the digital image signal. The D-A converter 460 makes use of the bias voltage signal from the bias voltage encoder 480 to convert the digital image signal from the second latch 450 into an analog image signal. In this case, since a voltage level of the bias voltage signal is controlled in accordance with a logical value of the digital image signal, the D-A converter 460 generates an analog image signal in which a gamma error, that is, a non-linear characteristic in a flat panel is corrected. The analog image signal generated at the D-A converter 460 is applied to the flat panel driver 350 shown in FIG. 3. The voltage generator 470 generates a plurality of bias voltage signals and applies them to the bias voltage encoder 480. At this time, n+1 bias voltage signals are generated at the voltage generator 470, and which have voltage levels different from each other. The bias voltage encoder 480 applies a bias voltage signal having a voltage level different in accordance with a logical value of the area identification code received, via the identification code register 490, from the area identification code generator 440 to the D-A converter 460. More specifically, the bias voltage encoder 480 selects a bias voltage signal corresponding to the logical value of the area identification code in the plurality of bias voltage signals from the voltage generator 470 and applies the selected bias voltage to the D-A converter 460. At this time, the bias voltage signal selected by the bias voltage encoder 480 determines a voltage variation rate in the analog image signal output from the D-A converter 460. A voltage level of the bias voltage signal applied to the D-A converter 460 in this manner is controlled in accordance with logical value regions of the digital image signal, so that a voltage variation rate in the analog image signal output from the D-A converter 460 becomes different. As a result, an analog image signal having a corrected nonlinear characteristic(i.e., gamma error) of the flat panel is generated at the D-A converter 460.

Figure 5A:
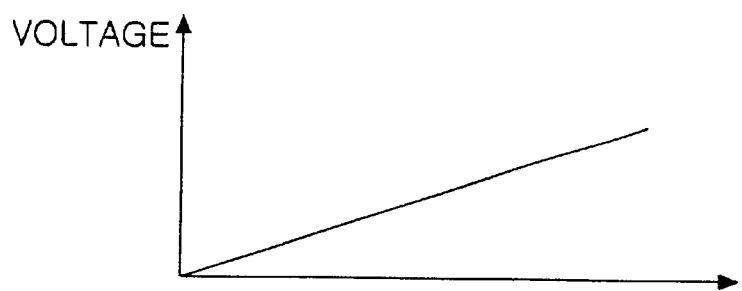
FIG. 5A to FIG. 5D are graphs for explaining a non-linear characteristic compensating operation according to the present invention.
Figure 5B:
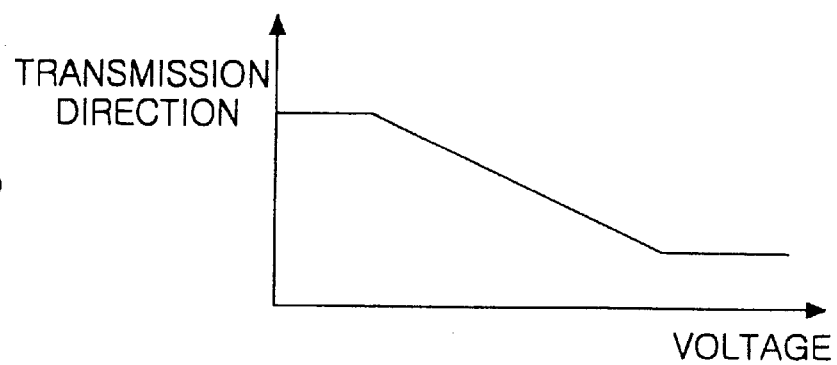
Figure 5C:
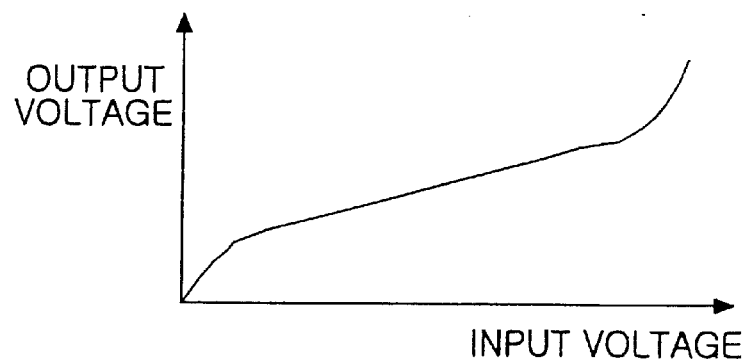
Figure 5D:
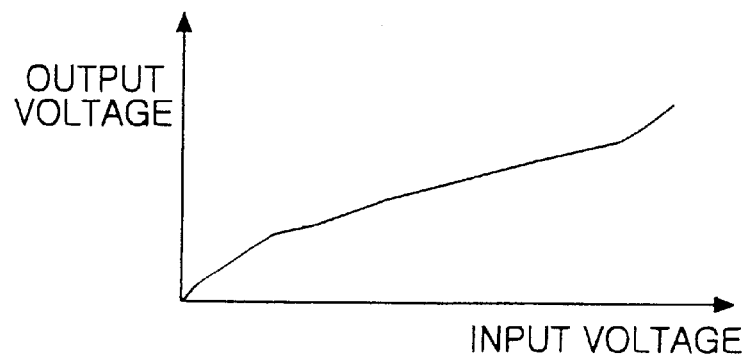

FIG. 5A represents a voltage variation in a typical analog image signal, and FIG. 5B represents a variation in a light quantity transmitted by a liquid crystal panel in response to the analog image signal as shown in FIG. 5A. As shown in FIG. 5B, a light quantity transmitting the liquid crystal panel changes in a non-linear pattern with respect to an analog image signal. In order to correct such a non-linear response characteristic in the liquid crystal panel, a gamma-corrected analog image signal changing in a non-linear pattern as shown in FIG. 5C must be applied to the liquid crystal panel driver. FIG. 5E represents a variation in an analog image signal output. from a gamma corrector when a gamma corrector according to an embodiment of the present invention is applied to a display apparatus making use of a liquid crystal panel. An analog image signal shown in FIG. 5D changes in a pattern almost equivalent to the analog image signal shown in FIG. 5C. As described above, in the gamma correcting apparatus according to an embodiment of the present invention, logical values available to a digital image signal are divided into a plurality of areas and a voltage level of the bias voltage signal used when the digital image signal is converted into an analog image signal in accordance with the areas, thereby generating an analog image signal corrected for each of all logical values available to a digital image signal. Accordingly, the gamma corrector according to an embodiment of the present invention compensates for a non-linear characteristic(i.e., a gamma error) in the flat display device so that may display all the colors corresponding to the number of logical values of the digital image signal and unify a picture quality of each product.

As described above, in the non-linear characteristic correcting apparatus in the display device according to the present invention, logical values of the digital image signal are divided into a plurality of areas and the bias voltage signal used during the D-A conversion is controlled in accordance with the plurality of areas, thereby compensating for the non-linear characteristic in the display device. Accordingly, the gamma corrector is capable of displaying all the colors corresponding to the number of logical values available to a digital image signal as well as unifying a picture quality of display apparatus making use of the same display device. Moreover, the gamma correcting apparatus according to the present invention can attain an improvement in the productivity.

Although the present invention has been explained by the embodiments shown in the drawings described above, it: should be understood to the ordinary skilled person in the art that the invention is not limited to the embodiments, but rather than that various changes or modifications thereof are possible without departing from the spirit of the invention. Accordingly, the scope of the invention shall be determined only by the appended claims and their equivalents.

What is claimed is:

1. A non-linear characteristic correcting apparatus in a display device, comprising:

signal input means for receiving a digital image signal;

a digital to analog converter for converting the digital image signal from the signal input means into an analog image signal required by the display device; and gamma correcting means for controlling a bias voltage applied to the digital to analog converter in accordance with a logical value of the digital image signal to compensate for a non-linear characteristic in the display device.

2. The non-linear characteristic correcting apparatus as claimed in claim 1, wherein said gamma correcting means comprises:

a bias voltage generator for generating a plurality of bias voltages to be applied to the digital to analog converter; and a bias voltage encoder for allowing any one of the plurality of bias voltages to be applied to the digital to analog converter in the logical value of the digital image signal from the signal input means.

3. The non-linear characteristic correcting apparatus as claimed in claim 1, further comprising:

means for synchronizing the digital image signal applied to the digital to analog converter with the bias voltage.

4. A non-linear characteristic correcting apparatus in a display device, comprising:

signal input means for receiving a digital image signal;

a digital to analog converter for converting the digital image signal from the signal input means into an analog image signal required by the display device;

area dividing means for dividing logical values available to the digital image signal into a plurality of areas; and gamma correcting means for controlling a bias voltage applied to the digital to analog converter in accordance with whether the digital image signal from the signal input means belongs to any one of the plurality of areas to compensate for a non-linear characteristic in the display device.

5. The non-linear characteristic correcting apparatus as claimed in claim 4, wherein said area dividing means comprises:

a plurality of registers for storing area boundary values each indicating a boundary between the plurality of areas.

6. The non-linear characteristic correcting apparatus as claimed in claim 5, wherein said gamma correcting means comprises:

a bias voltage generator for generating a plurality of bias voltages to be applied to the digital to analog converter;

a comparator for comparing the digital image signal from the signal input means with the plurality of area boundary values from the plurality of registers;

area identifying means for generating an area identification code indicating that the digital image signal input to the signal input means on a basis of an output signal of the comparator; and a bias voltage encoder for allowing any one of the plurality of bias voltages to be applied to the digital to analog converter in response to the area identification code from the area identifying means.

7. The non-linear characteristic correcting apparatus as claimed in claim 6, wherein said gamma correcting means further comprises:

a code register for temporarily storing the area identification code to be applied from the area identifying means to the bias voltage encoder.

8. The non-linear characteristic correcting apparatus as claimed in claim 4, further comprising:

means for synchronizing the digital image signal applied to the digital to analog converter with the bias voltage.

9. A method for correcting a non-linear characteristic in a display device, comprising:

receiving a digital image signal;

selecting any one of a plurality of bias voltages in response to a logical value of the digital image signal; and converting the digital image signal into an analog image signal using the selected bias voltage to compensate for the non-linear characteristic in the display device.

10. The method as claimed in claim 9, wherein said selecting comprises:

generating the plurality of bias voltages; and selecting any one of the plurality of bias voltages in accordance with the logical value of the digital image signal.

* * * * *